(12) United States Patent
Pannek et al.

(10) Patent No.: US 10,935,129 B2
(45) Date of Patent: Mar. 2, 2021

(54) METHOD AND CONTROL UNIT FOR DETERMINING AN OPERATING CONDITION OF A FORM-LOCKING SHIFTING ELEMENT

(71) Applicant: ZF Friedrichshafen AG, Friedrichshafen (DE)

(72) Inventors: Christian Pannek, Friedrichshafen (DE); Martina Jehle, Kressbronn (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/700,492

(22) Filed: Dec. 2, 2019

(65) Prior Publication Data

US 2020/0173544 A1 Jun. 4, 2020

(30) Foreign Application Priority Data

Dec. 3, 2018 (DE) ...................... 10 2018 220 873.5

(51) Int. Cl.
*F16H 61/00* (2006.01)
*F16H 61/12* (2010.01)
*F16H 61/02* (2006.01)

(52) U.S. Cl.
CPC ......... *F16H 61/12* (2013.01); *F16H 61/0265* (2013.01); *F16H 2061/0075* (2013.01);
(Continued)

(58) Field of Classification Search
CPC ............. F16H 61/12; F16H 2061/0075; F16H 2200/0065; F16H 2200/2046;
(Continued)

(56) References Cited

U.S. PATENT DOCUMENTS 7,789,792 B2 9/2010 Kamm et al.
8,398,522 B2 3/2013 Bauknecht et al.
(Continued)

FOREIGN PATENT DOCUMENTS

DE 102005002337 A1 8/2006
DE 102008000429 A1 9/2009
(Continued)

OTHER PUBLICATIONS

German Search Report DE102018220873.5, dated Oct. 14, 2019. (14 pages).

*Primary Examiner* — David J Hlavka
(74) *Attorney, Agent, or Firm* — Dority & Manning, P.A.

(57) ABSTRACT

A form-locking shift element may include a first shift-element half and a second shift-element half which are engageable with each other by moving at least the first shift-element half. A method for determining an operating condition of the form-locking shift element may include monitoring a position of the first shift-element half with a sensor, and, when a value of a signal generated by the sensor is greater than an applicable value and when the first shift-element half is actuated and displaced towards an engaged operating condition, determining that the shift element is sufficiently engaged to transmit a torque at the form-locking shift element. The applicable value corresponds to a defined overlap between the first and second shift-element halves that is less than an overlap when the first shift-element half is in the engaged operating condition.

18 Claims, 8 Drawing Sheets

(52) U.S. Cl.
CPC .............. *F16H 2061/1212* (2013.01); *F16H 2200/0065* (2013.01); *F16H 2200/2012* (2013.01); *F16H 2200/2046* (2013.01)

(58) Field of Classification Search
CPC ......... F16H 61/0265; F16H 2200/2012; F16H 2061/1212; F16H 61/686; F16H 61/0204; F16H 2059/6823; F16H 59/68; F16H 1/48; F16H 61/04; B60Y 2400/421
See application file for complete search history.

(56) References Cited

U.S. PATENT DOCUMENTS

| | | | |
|---|---|---|---|
| 8,483,918 | B2 | 7/2013 | Arnold et al. |
| 8,647,237 | B2 | 2/2014 | Prix et al. |
| 9,109,634 | B2* | 8/2015 | Tronnberg .............. F16D 11/10 |
| 9,625,032 | B2 | 4/2017 | Maurer et al. |
| 2014/0283637 | A1* | 9/2014 | Iwasaki ................... F16H 3/083 |
| | | | 74/335 |
| 2017/0219054 | A1* | 8/2017 | Martin .................... F16H 57/08 |
| 2020/0240504 | A1* | 7/2020 | Lebang .................. F16H 61/04 |

FOREIGN PATENT DOCUMENTS

| | | |
|---|---|---|
| DE | 102009002205 A1 | 10/2010 |
| DE | 102011010616 A1 | 1/2012 |
| DE | 102013222381 A1 | 5/2015 |
| DE | 102017201753 A1 | 8/2018 |
| DE | 102017202081 A1 | 8/2018 |

* cited by examiner

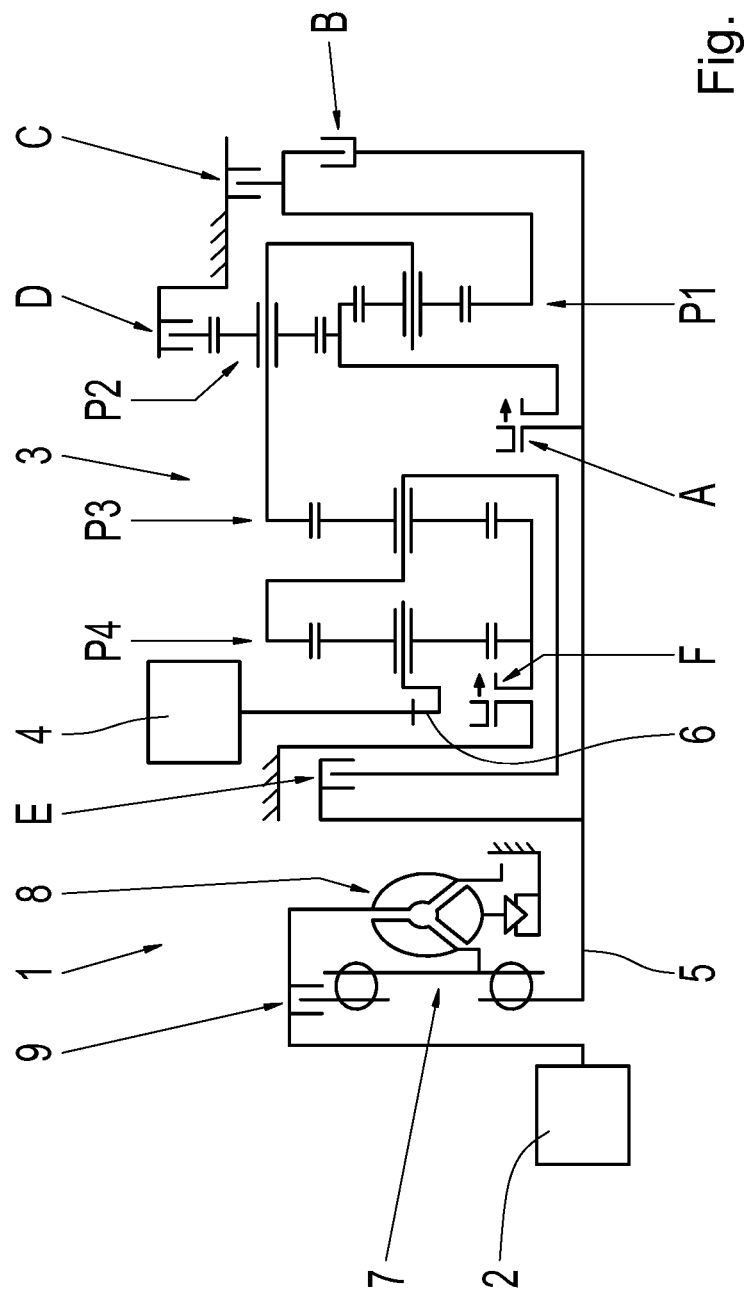

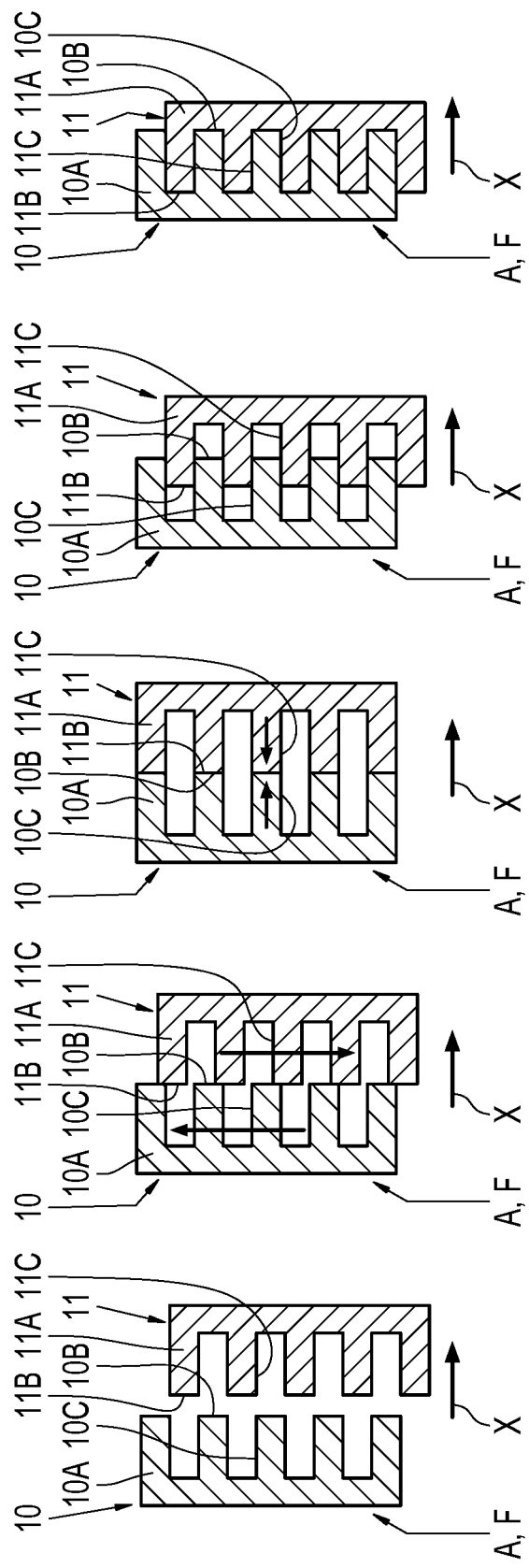

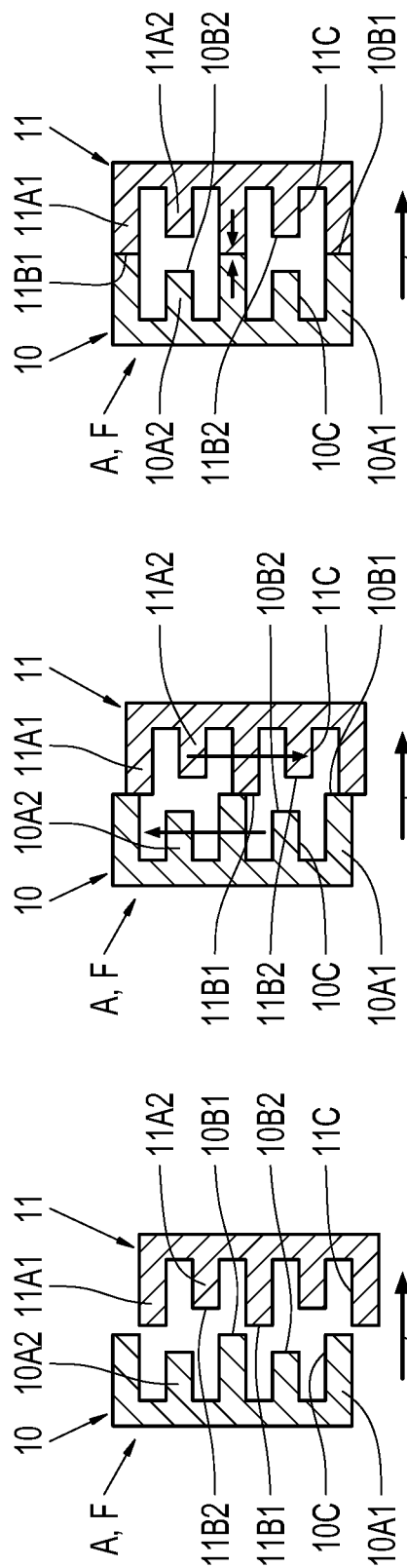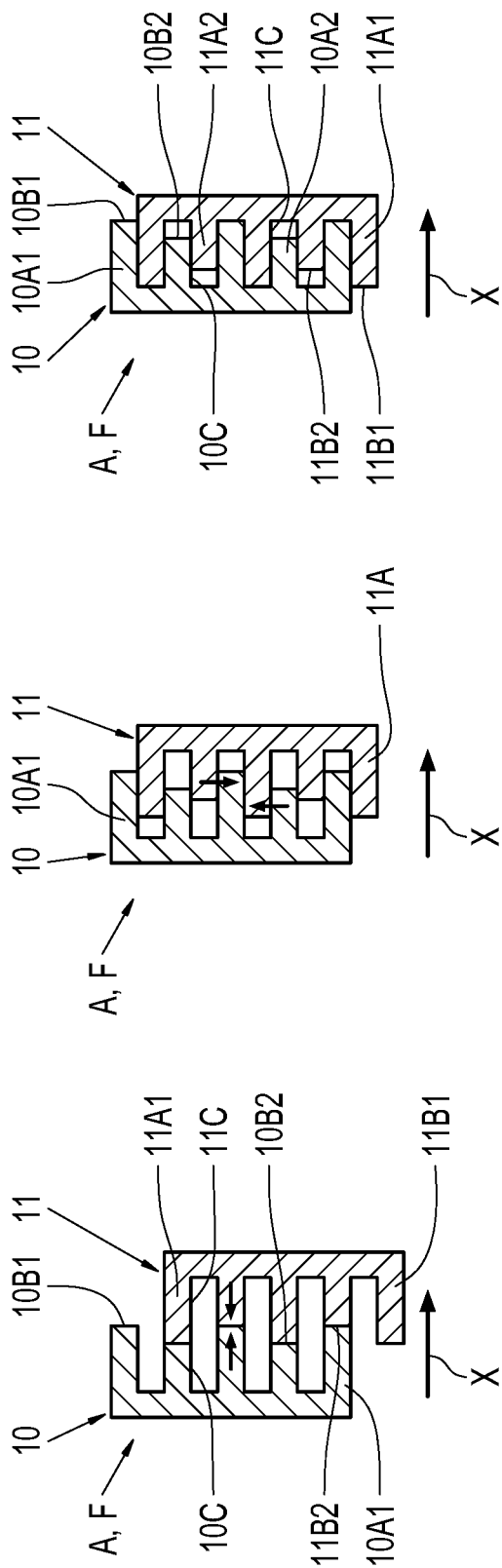

METHOD AND CONTROL UNIT FOR DETERMINING AN OPERATING CONDITION OF A FORM-LOCKING SHIFTING ELEMENT

CROSS-REFERENCE TO RELATED APPLICATION

The present application is related and has right of priority to German Patent Application No. 10 2018 220 873.5 filed on Dec. 3, 2018, the entirety of which is incorporated by reference for all purposes. Additionally, the present application to is related to German Patent Application No. 10 2018 220 872.7 filed on Dec. 3, 2018, the entirety of which is incorporated by reference for all purposes.

FIELD OF THE INVENTION

The invention relates generally to a method for determining an operating condition of a form-locking shift element. Moreover, the invention relates to a control unit for carrying out the method as well as to a corresponding computer program.

BACKGROUND

DE 10 2005 002 337 A1 describes an eight-speed multi-stage transmission having friction-locking shift elements. The shift elements are multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device, in order to transmit a torque.

In general, in the presence of a demand to disengage a friction-locking shift element, regardless of the torque presently transmitted via the friction-locking shift element, it is assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the determination of an appropriate disengagement control signal or an appropriate engagement control signal for transferring the friction-locking shift element into its disengaged operating condition or its engaged operating condition, respectively, it is easily verified whether a shift change or gear change was successful, via such an evaluation.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1 increasingly include not only friction-locking shift elements but also form-locking shift elements. These types of form-locking shift elements usually have two shift-element halves. The shift-element halves are brought into form-locking engagement with one another, at dog elements, or the like of the shift-element halves, via axial displacement of at least one movable shift-element half with respect to the other shift-element half, which is not axially displaceable. Thereupon, the form-locking shift element is engaged and transmits an applied torque. Moreover, it is also possible that both shift-element halves are axially movable with respect to one another.

If the form-locking shift element is to be disengaged from the power flow, the positive engagement between the shift-element halves is disengaged via axial displacement of the movable shift-element half with respect to the axially fixed shift-element half. Form-locking shift elements are used because, in contrast to friction-locking shift elements, essentially no drag torques occur with disengaged form-locking shift elements. Drag torques adversely affect the overall efficiency of a transmission. However, form-locking shift elements, as compared to friction-locking shift elements, are transferable out of a disengaged operating condition, in which no torque is transmittable by the form-locking shift elements, into their engaged operating condition only close to their synchronous speed.

Additionally, form-locking shift elements engaged into the power flow of a transmission device are disengageable from the power flow or transferable into their disengaged operating condition using low shifting forces if the applied torque has an appropriately low value. During gear change operations or so-called gear disengagement operations, a power flow between a transmission input shaft and a transmission output shaft is to be interrupted in the transmission. In this case, a form-locking shift element is to be transferred, if necessary, from its engaged operating condition into its disengaged operating condition. Due to an excessively rapid or faulty build-up of the torque applied to the form-locking shift element, or due to a faulty reduction of the applied torque, the form-locking shift element may not be transferable into its disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferable into its engaged operating condition within desirably short operating times. This is the case, for example, when the sought positive engagement between the shift-element halves cannot be established due to a so-called tooth-on-tooth position. In the event of such a tooth-on-tooth position, dog elements of the shift-element halves rest against one another at their end faces and the differential speed between the shift-element halves is zero. Such a tooth-on-tooth position is released only when a torque present at the form-locking shift element is greater than the static friction torque between the end faces of the dog elements of the shift-element halves.

Moreover, the establishment of a complete positive engagement between the shift-element halves or the complete engagement of a form-locking shift element is also preventable by a so-called flank clamping between the flanks of the dog elements. In the event of such a flank clamping, the two shift element halves have axial overlap of their dog elements. However, the static friction between the flanks of the dog elements of the shift-element halves, which are resting against one another, is so high that the engagement force acting on the shift elements in the engagement direction is not sufficient to overcome the static friction and completely engage the form-locking shift element.

If a form-locking shift element remains in a so-called intermediate position, which is located between a completely disengaged operating condition and a completely engaged operating condition, during an engagement process, attempts are made with various approaches to release this undesirable intermediate position. It is problematic, however, that the approaches for releasing a tooth-on-tooth position or a flank clamping differ greatly from one another and, if applied incorrectly, adversely affect ride comfort and lengthen shift times to a considerable extent. For instance, the approach for releasing a tooth-on-tooth position strengthens a flank clamping and the approach for releasing a flank clamping maintains a tooth-on-tooth position.

Sensors are installed in order to be able to monitor the particular existing operating condition of a form-locking shift element. These sensors include, for example, a permanent magnet and a measuring unit for sensing the magnetic field of the permanent magnet. Additionally, the sensors have a ferromagnetic sensor contour, which influences the magnetic field of the permanent magnet depending on the operating conditions of the shift-element halves. Various magnetic field-sensing elements are known, such as elements or magnetoresistive elements based on a Hall effect. Magnetic field sensors generally have elements sensing a magnetic field or other electronic components, wherein some magnetic field sensors have permanent magnets in a back-biased arrangement.

These types of magnetic field sensors provide electrical signals, which represent the condition of a sensed magnetic field. In some embodiments, magnetic field sensors cooperate with ferromagnetic objects. Using the magnetic field sensors, magnetic field fluctuations are determined, which are caused by an object moved through the magnetic field of a magnet of a magnetic field sensor. The magnetic field monitored with the magnetic field sensor also varies, as is known, depending on a shape or a profile of the moving ferromagnetic object. The position determination of the shift-element halves is calculated directly from the raw signals of the sensors using applicable thresholds.

Disadvantageously, this approach causes all tolerances of the sensor and of the sensing system, as well as the production-related scatterings, to flow into the position determination. As a result, the position determination of the shift-element halves does not have the accuracy necessary for operating a transmission.

The poor accuracy of the determination of the position of the shift-element halves with respect to one another during a disengagement process or an engagement process may also result in an incorrect approach being carried out for releasing the intermediate position of the shift element when a form-locking shift element has seized, in particular during an engagement process.

Additionally, it is disadvantageous that the torque to be transmitted is applied to the form-locking shift element only after a successful determination of the completely engaged operating condition of a form-locking shift element. No significant torque is applied to the form-locking shift element before the determination of the completely engaged operating condition, in order to prevent damage.

This approach is also applied when a form-locking shift element is in its nearly completely engaged operating condition and the dog elements of the shift-element half largely overlap.

Form-locking shift elements are structurally designed such that a defined torque is transmittable when the shift-element halves partially overlap, without irreversibly damaging a form-locking shift element. If a demanded engagement process of a form-locking shift element lasts longer than a defined shift time, actuation routines are started, via which a form-locking shift element is transferable into its complete operating condition. However, these actuation routines adversely affect a shift quality.

Starting from the above-described prior art, the problem addressed by the invention is that of creating a method for determining an operating condition of a form-locking shift element, by which an actuation of a form-locking shift element is implementable with high shift quality within short shift times. Additionally, a control unit for carrying out the method, and a computer program product for carrying out the method are to be described.

SUMMARY OF THE INVENTION

A method is provided for determining an operating condition of a form-locking shift element. The shift element has two shift-element halves, which are brought into engagement with one another in a form-locking manner. At least one of the shift-element halves is displaceable between a first end position, which corresponds to a disengaged operating condition of the shift element, and a second end position. The second end position corresponds to an engaged operating condition of the shift element. A current position of the shift-element half is monitored with a sensor.

In the present case, for example, constant-mesh shift elements, which transmit a torque via a form-locking connection, are subsumed under the term "form-locking shift element". Moreover, shift elements, such as clutches or brakes in the present case, are subsumed in the following under the term "friction-locking shift element", which transmit a torque via a friction-locking connection. The torque transmittable with such a friction-locking shift element varies depending on the particular engagement force applied to the friction-locking shift element and is preferably infinitely variable, where the engagement force corresponds, for example, to a hydraulic pressure applied to the shift element. In contrast thereto, the torque transmittable with a form-locking shift element is not infinitely variable.

Thus, an operating condition of the shift element that is sufficiently engaged to transmit a torque present at the shift element is detected if the signal of the sensor has a value greater than an applicable value for a defined time period. The applicable value corresponds to a defined overlap between the shift-element halves, which is less than the overlap between the shift-element halves if the displaceable shift-element half is located in its second end position. Moreover, the extent of overlap between the shift-element halves that is sufficient for the transmission is detected if the displaceable shift-element half is further actuated and displaced towards the second end position.

In the approach according to the invention, parameterizable threshold values are preferably utilized for the determination of the operating condition or of the shifting travel of the movable shift-element half, which are located ahead of the end position and indicate a sufficient extent of overlap between the shift-element halves.

A sufficient tooth overlap of a form-locking shift element is detected if the current shifting-travel value of the movable shift-element half is located in the range of the sufficient partial overlap for a parameterizable time.

This minimal partial overlap is, for example, applicatively determinable and ensures a durability of a form-locking shift element.

Upon detection of such an extent of overlap between the shift-element halves of a form-locking shift element, the status of the form-locking shift element that the form-locking shift element has an operating condition that is at least approximately equivalent to the completely engaged operating condition is transmitted, for example, to a transmission control unit. The information that the shift element is capable of transmitting a torque to be applied is also transmitted. Additionally, the information that the form-locking shift element has only a partially overlapped operating condition is also transmitted to the transmission control unit.

Using this approach, the engagement process of a form-locking shift element is terminated within short operating times and additional measures are omitted, which are usually activated in order to completely engage a form-locking shift element. This is advantageous since, as is known, such additional measures affect a shift quality and lengthen shift times of form-locking shift elements to an undesirable extent.

The term "parameterizable" in combination with a value, an adaptation value, an operating parameter, a threshold value, a time value, or the like, is understood, in the present case, to be such a parameter or such a value, whose quantity and value is changeable without the need to carry out a reprogramming or a reinstallation of a control unit software of a control unit.

In an advantageous embodiment of the method according to the invention, upon detection of a movement of the displaceable shift-element half towards the first end position, the torque present at the shift element is reduced and the actuation force acting in the engagement direction is raised. As a result, it is ensured that the form-locking shift element is transferred into its engaged operating condition to the demanded extent.

If the applicable value is varied based on the particular torque present at the shift element, the value of the partial overlap becomes more precise and the minimum overlap between the shift-element halves is parameterized with less tolerance correction.

This approach offers the advantage that a scaling of the partial overlap also makes it possible to scale the particular transmittable torque.

In this way, for example, given a partial overlap of 50%, a torque corresponding to approximately 30% of the maximum transmittable torque is transmittable with the form-locking shift element. Depending on the particular application, a partial overlap, for example, of 60%, could be suitable for transmitting 50% of the maximum torque.

In an advantageous embodiment of the method according to the invention, a tooth-on-tooth position is identified if it is detected with the sensor, within an actuating-travel range of the at least one movable shift-element half between a disengaged condition and an engaged condition of the shift element, that the actuating movement of the at least one movable shift-element half in the engagement direction is zero. Moreover, it is checked whether a ratio between an engagement force applied to the shift element and a radial force acting on the shift-element halves, which results from a torque present at the shift element, is within a value range within which a tooth-on-tooth position very likely occurs. Moreover, a tooth-on-tooth position is determined when an actuating movement of the at least one movable shift-element half in the engagement direction is detected with the sensor after a reduction of the engagement force and/or after an increase of the applied torque.

By this approach, it is unambiguously differentiated, in a simple way, whether the form-locking shift element was not moved during an actuation within the current actuating-travel range to the demanded extent towards the engaged or the disengaged operating condition due to a tooth-on-tooth position or due to a flank clamping.

By knowing the actuating-travel range between two shift-element halves of a form-locking shift element, within which a tooth-on-tooth position occurs, the measure provided for releasing a tooth-on-tooth position is initiated and the tooth-on-tooth position is ended to the desired extent. As a result, for example, a gear shift within a transmission, to which the form-locking shift element contributes, is implementable in a simple way within short shift times.

Additionally, if the shift element is not transferred into its engaged operating condition to the desired extent due to a flank clamping, it is also possible to release the flank clamping using suitable measures to transfer the form-locking shift element into its engaged operating condition within short operating times. If the flank clamping occurs, for example, when a detected extent of overlap is greater than a threshold value, a releasing measure of the flank clamping may also be possibly omitted in its entirety. This threshold value corresponds to an overlap limit, at which the particular torque present at or to be applied to the form-locking shift element is transmittable with the form-locking shift element without causing impermissibly high loads at the flanks.

In an advantageous embodiment of the method according to the invention, the determination of the actuating-travel range between the shift-element halves is started if an actuating movement of the at least one movable shift-element half in the engagement direction is determined with the sensor to be equal to zero. However, the determination of the actuating-travel range between the shift-element halves is first started when a signal of the sensor, is greater than or equal to a predefined lower threshold value and less than or equal to a predefined upper threshold value within a time period, which is equal to a predefined time period or is longer than the predefined time period.

As a result, the determination of the actuating-travel range is first carried out when the presence of a tooth-on-tooth position is likely and the intermediate position, for which the determination is carried out, is characterized by sufficient stability.

If the determination of the actuating-travel range between the shift-element halves corresponding to a tooth-on-tooth position is carried out for the first time, then, according to an advantageous embodiment of the method according to the invention, the minimum value of the signal of the sensor and the maximum value of the signal of the sensor delimit the actuating-travel range between the shift-element halves.

Thus, the two extreme values determined for the first time with the sensor form the limits of the actuating-travel range of the shift-element halves, within which a tooth-on-tooth position is to be expected.

In a further advantageous embodiment of the method according to the invention, the limits of the actuating-travel range are changed based on further values of the signal of the sensor if the further values of the signal of the sensor deviate from the previously determined values of the signal of the sensor by more than an absolute value of a threshold value in each case. The further values of the signal of the sensor are determined for each detected tooth-on-tooth position during further determinations of the actuating-travel range between the shift-element halves.

With this approach, the actuating-travel range is enlarged or expanded with little outlay if smaller minimal positions of the shift-element halves and/or larger maximum positions of the shift-element halves are determined.

In a further advantageous embodiment of the method according to the invention, the limits of the actuating-travel range are varied based on the particular currently determined values of the signal of the sensor. The values of the signal of the sensor are changed when a distance between the actuating-travel range defined by the currently determined values of the signal of the sensor and the actuating-travel range that was previously determined is less than or equal to a predefined threshold value. Therefore, it is validated, in a simple way, whether the previous actuating-travel range and/or tooth-on-tooth range and the newly detected actuating-travel range or tooth-on-tooth range are too far apart from one another.

If the actuating-travel ranges are too far apart from one another and the previously determined actuating-travel range was established depending on a number of detected tooth-on-tooth positions that is less than a threshold value, then, in a further advantageous embodiment of the method according to the invention, the limits of the previously determined actuating-travel range are discarded. The actuating-travel range is then redetermined in a subsequent determination of a tooth-on-tooth position.

Therefore, an incorrect determination of the actuating-travel range is avoided in a simple way, even if a low number of tooth-on-tooth positions were initially detected.

In an advantageous embodiment of the method according to the invention, the determination of the actuating-travel range at a high level of accuracy is ensured throughout the service life of the form-locking shift element. For this purpose, the actuating-travel range is enlarged by varying the limits depending on the determined values of the signal of the sensor until a distance between the limits of the actuating-travel range is greater than or equal to a predefined maximum value.

In an embodiment of the method according to the invention, the minimum value of the signal of the sensor and likewise the maximum value of the signal of the sensor are determined for each tooth-on-tooth position and are compared to the respective limits of an actuating-travel range that was already determined depending on a number of ascertained tooth-on-tooth positions greater than a threshold value. The limits of the actuating-travel range are increased or decreased by an offset if the determined minimum value of the signal of the sensor deviates from the lower limit of the actuating-travel range or the determined maximum value of the signal of the sensor deviates from the upper limit of the actuating-travel range by values greater than an absolute value of a threshold value.

In an embodiment of the method according to the invention, the limits of the actuating-travel range are varied depending on the minimum value of the signal of the sensor determined for a tooth-on-tooth position or likewise the determined maximum value of the signal of the sensor, respectively, when the distance between the limits of the actuating-travel range has already reached or fallen below the maximum value, and the minimum value or the maximum value of the signal of the sensor is outside the actuating-travel range. The limits of the actuating-travel range are then each adapted, in a mutually coordinated manner, such that the distance between the limits of the adapted actuating-travel range essentially does not exceed the maximum distance. It is therefore ensured that the detection of a tooth-on-tooth position is carried out with little outlay throughout the service life of a form-locking shift element with a high level of accuracy.

In a further advantageous embodiment of the method according to the invention, two actuating-travel ranges are determined starting from two predefined actuating-travel ranges between the shift-element halves that overlap when each of the shift-element halves has two groups of dog elements. The first group of dog elements has a longer length in the actuation direction of the at least one movable shift-element half than the dog elements of the second group. Additionally, the dog elements of the two groups alternate in the circumferential direction of the shift-element halves.

Therefore, tooth-on-tooth positions of such a form-locking shift element, which occurs between the longer dog elements of the shift-element halves or between the longer dog elements of the one shift-element half and the shorter dog elements of the other shift-element half, are determined to the desired extent with little outlay.

In this case, it is possible that the limits of the actuating-travel ranges are adapted until all values of the signal of the sensor, which are determined for tooth-on-tooth positions and lie within the overlap area of the two actuating-travel ranges, are assigned to only one of the two actuating-travel ranges. As a result, it is ensured that tooth-on-tooth positions for the latter-mentioned operating conditions of a shift element including a so-called catch tooth dog are each assigned to the one actuating-travel range or to the other actuating-travel range.

With a further advantageous embodiment of the method according to the invention, incorrect determinations are avoided with little outlay. For this purpose, it is provided that the actuating-travel range has a minimum width and corresponds to a value range for signals of the sensor which are determined for tooth-on-tooth positions between the longer dog elements of the shift-element halves. The minimum width of this actuating-travel range is provided in such a way that the minimum values and maximum values of the signal determined for a tooth-on-tooth position are both encompassed by the actuating-travel range. Additionally, the minimum width is also established depending on deviations of the signals, which result from load-induced movements of the entire shift element with respect to the sensor and from a tolerance-related sensor behavior.

The invention also relates to a control unit, which carries out the method according to the invention. The control unit has, for example, means for carrying out the method according to the invention. These means are hardware-related means and software-related means. The hardware-related means of the control unit or of the control device are, for example, data interfaces for exchanging data with the assemblies of the vehicle drive train contributing to the carrying-out of the method according to the invention. Further hardware-related means are, for example, a memory for data storage and a processor for data processing. Software-related means are, inter alia, program modules for carrying out the method according to the invention.

In order to carry out the method according to the invention, the control unit is operable using at least one receiver interface, which is receives signals from signal transmitters. The signal transmitters are, for example, sensors, which gather measured quantities and transmit them to the control unit. A signal transmitter is also referred to as a signal sensing element. In this way, the receiver interface receives a signal from a signal transmitter, by which it is signaled that an operating condition of a form-locking shift element is to be determined. The signal is generated by a driving strategy, which is activated and carried out in the control unit or in a further control unit of a transmission or of a vehicle drive train.

The control unit also has a data processing unit, in order to evaluate and/or process the received input signals or the information of the received input signals.

The control unit also includes a transmitter interface, which outputs control signals to actuating elements. An actuating element is understood to include actuators that implement the commands of the control unit. The actuators are, for example, electromagnetic valves.

If, during the actuation of the form-locking shift element, it is detected by the control unit or determined based on received input signals that an operating condition of the form-locking shift element is to be determined, the control unit determines, on the basis of gathered input signals, an appropriate demand and initiates an appropriate determination. The form-locking shift element has two shift-element halves, which are brought into engagement with one another in a form-locking manner, wherein at least one of the shift-element halves is displaceable between a first end position and a second end position. The first end position corresponds to a disengaged operating condition and the second end position corresponds to an engaged operating condition of the shift element. A current position of the shift-element half is monitored with a sensor.

The control unit allows an operating condition of the shift element that is sufficiently engaged to transmit a torque present at the shift element to be detected if the signal of the sensor has a value greater than an applicable value for a defined time period.

The applicable value corresponds to a defined overlap between the shift-element halves, which is less than the overlap between the shift-element halves if the displaceable shift-element half is located in its second end position. Moreover, the control unit determines the operating condition that is sufficiently engaged in order to transmit a torque present at the shift element if the displaceable shift-element half is additionally actuated and displaced towards the second end position.

As a result, a torque to be transmitted is also applied to a form-locking shift element when the form-locking shift element is not yet in its completely engaged operating condition. This offers the advantage that a gear change operation, to which a form-locking shift element contributes, is implementable within short operating times in combination with a high level of shifting comfort. Thus, advantageously, known actuation routines, in which a shift element that is not completely engaged is first transferred into its completely engaged operating condition, do not need to be carried out. Since the known actuation routines adversely affect a shifting comfort to a non-negligible extent, they are to be activated or carried out only to avoid undefined operating conditions of a transmission including a form-locking shift element.

The aforementioned signals are to be considered merely as examples and are not to limit the invention. The gathered input signals and the output control signals are transmittable via a vehicle bus, for example, via a CAN-BUS. The control device or the control unit is, for example, a central electronic control unit of the vehicle drive train or an electronic transmission control unit.

The approach according to the invention is also embodied as a computer program, which, when running on a processor of a control device, instructs the processor from the software point of view to carry out the assigned method steps, which are subjects of the invention. In this context, a machine-readable medium, on which an above-described computer program product is retrievably stored, is also a subject of the invention.

BRIEF DESCRIPTION OF THE DRAWINGS

Preferred refinements result from the dependent claims and the following description. An exemplary embodiment of the invention is explained in greater detail with reference to the drawing, without being limited thereto. Wherein:

FIG. 1 shows a schematic view of a vehicle drive train having a prime mover, a transmission, and a driven end;

FIG. 2 shows a shift logic table of the transmission shown in FIG. 1;

FIGS. 3a-3e each show various, highly schematic views of different operating conditions of a form-locking shift element between a completely disengaged condition and a completely engaged condition;

FIGS. 4a-4f each show representations corresponding to FIG. 3a of various operating conditions of a form-locking shift element, whose dog elements have different lengths;

FIGS. 6a-6d show graphic representations of a further approach for exactly determining actuating-travel ranges for tooth-on-tooth positions of a form-locking shift element according to FIG. 4a;

FIGS. 8a-8b each show a representation corresponding to FIGS. 6a-6d of a further approach for determining, in a defined way, actuating-travel ranges for tooth-on-tooth positions of a shift element according to FIG. 4a.

DETAILED DESCRIPTION

Figure 5A:
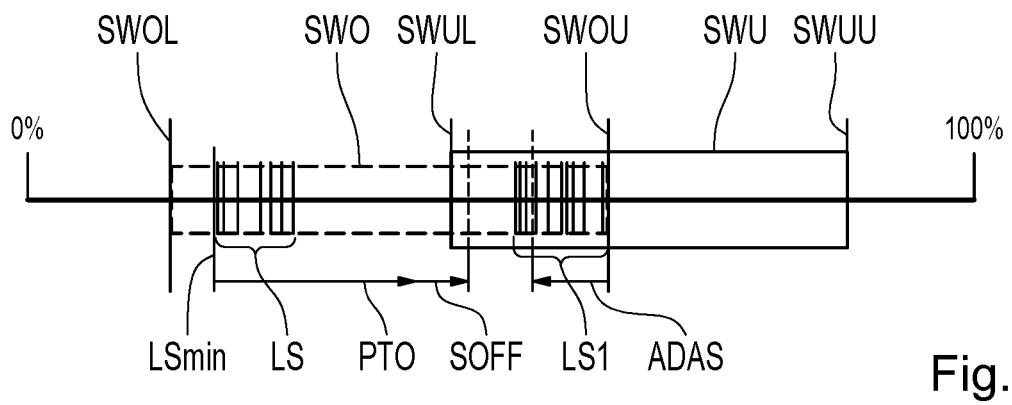
FIG. 5a shows an actuating travel range of the form-locking shift element according to FIG. 4a between a completely engaged condition and a completely disengaged operating condition, the actuating travel range including a first predefined actuating-travel range, within which tooth-on-tooth positions are expected between longer dog elements, and a second predefined actuating-travel range, within which tooth-on-tooth positions are expected between longer and shorter dog elements of the shift-element halves.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a vehicle drive train 1 having a prime mover 2, transmission 3, and a driven end 4. The prime mover 2 is an internal combustion engine in this case. The transmission 3 is an automatic transmission, in which multiple gear stages "1"-"9" for forward travel and at least one gear stage "R" for travel in reverse are implementable. Depending on the particular configuration of the vehicle drive train 1, the driven end 4 has one, two, or more drivable vehicle axles, to which the torque of the prime mover 2 is applicable via the transmission 3. The transmission 3 further has hydraulically actuatable shift elements including a first shift element A, a second shift element B, a third shift element C, a fourth shift element D, a fifth shift element E, and a sixth shift element F. The hydraulically actuatable shift elements A-F are actuated during a ratio change in the transmission 3, i.e., during upshifts or downshifts. The ratio changes are carried out essentially without an interruption of tractive force, in combination with a high level of ride comfort and at a desired level of performance. The term "performance" is understood to mean, in each case, a ratio change in the transmission 3 that is implemented within a defined operating time.

In order to carry out the particular demanded gear shift to the desired extent, shift elements A-F are acted upon by shift sequences stored in a transmission control unit and a shift pressure corresponding to the particular shift sequence.

The transmission 3 has a transmission input shaft 5 and a transmission output shaft 6. The transmission output shaft 6 is connected to the driven end 4. In the present case, a torsion damper 7 and, as a starting component, a hydrodynamic torque converter 8 having an associated torque converter lockup clutch 9, are arranged between the transmission input shaft 5 and the prime mover 2.

In addition, the transmission 3 has a first planetary gear set P1, a second planetary gear set P2, a third planetary gear set P3, and a fourth planetary gear set P4. The first planetary gear set P1 and the second planetary gear set P2, which are preferably minus planetary gear sets, form a shiftable front-mounted gear set. The third planetary gear set P3 and the fourth planetary gear set P4 represent a so-called main gear set. The third, fourth, and sixth shift elements C, D, F of the transmission 3 are brakes, while the first, second, and fifth shift elements A, B, E are separating clutches.

A selective shifting of the gear stages "1"-"R" are implementable with the shift elements A-F according to the shift logic represented in greater detail in FIG. 2. In order to establish a power flow in the transmission, essentially three of the shift elements A-F are to be transferred into or held in an engaged operating condition essentially simultaneously for each gear stage "1"-"R".

The first and sixth shift elements A, F are, in this case, form-locking shift elements without additional synchronization. As a result, in the case of the transmission 3, as compared to transmissions including only friction-locking shift elements, drag torques caused by disengaged friction-locking shift elements are reduced.

As is known, form-locking shift elements are generally transferable out of a disengaged operating condition into an engaged operating condition only within a very narrow differential speed range, encompassing the synchronous speed, between the shift-element halves to be brought into an operative connection with one another in a form-locking manner. If the synchronization of a form-locking shift element to be engaged are not carried out with additional structural embodiments, the synchronization is implemented via an appropriate actuation of the further friction-locking shift elements contributing to the gear shift and/or a so-called engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

FIGS. 3*a*-3*e* each show a first shift-element half 10 and a second shift element half 11 of a form-locking shift element A, F in various operating conditions. FIG. 3*a* shows the completely disengaged operating condition of the form-locking shift element A, F, in which there is no positive engagement between the two shift-element halves 10, 11 and in which the shift-element halves 10, 11 are spaced apart from one another in the axial direction x.

The first shift-element half 10 has a first dog element 10A and the second shift element 11 has a second dog element 11A. The dog elements 10A, 11A are brought into engagement with one another in a form-locking manner depending on the particular current application via axial displacement of the first shift-element half 10 relative to the second shift-element half 11 and/or of the second shift-element half 11 relative to the first shift-element half 10 to transmit a torque present at the form-locking shift element A, F to the desired extent.

In the presence of an appropriate demand to engage the form-locking shift element A, F, an appropriate actuation force is applied in the engagement direction at the particular displaceable shift-element half 10, 11. As a result, the axial distance between end faces 10B, 11B of the dog elements 10A, 11A facing one another is increasingly reduced.

If the differential speed between the shift-element halves 10, 11 is too great, the dog elements 10A, 11A are not brought into engagement with one another in a form-locking manner. In such a case, a so-called rattling occurs, during which the dog elements 10A, 11A glide off of one another at their facing end faces 10B, 11B in the circumferential direction of the shift-element halves 10, 11 to the extent shown in FIG. 3*b*. Such a rattling is undesirable, however, since it causes irreversible damage of the dog elements 10A, 11A as the period of operation increases.

For this reason, the differential speed between the shift-element halves 10, 11 is adjusted to values within a differential speed window, which encompasses the synchronous speed of the form-locking shift element A, F, via appropriate actuation of the particular friction-locking shift elements B-E contributing to the operating condition change in the transmission 3. Within this differential speed window, the dog elements 10A, 11A of the shift-element halves 10, 11 are brought into engagement with each other in a form-locking manner to the desired extent.

It should be noted, however, that the positive engagement to be established is preventable by a so-called tooth-on-tooth position between the shift-element halves 10, 11. The tooth-on-tooth position, as represented in FIG. 3*c*, is characterized in that the dog elements 10A, 11A rest against one another at their end faces 10B, 11B, and the differential speed between the shift-element halves 10, 11 is zero. During such a tooth-on-tooth position of the form-locking shift element A, F, the static friction between the end faces 10B, 11B of the dog elements 10A, 11A is so great that the torque present at the form-locking shift element A, F is transmitted via the form-locking shift element A, F without the tooth-on-tooth position being released.

In order to release the tooth-on-tooth position, it is advantageous if the actuation force present at the form-locking shift element A, F in the engagement direction is reduced and/or the torque present at the form-locking shift element A, F is increased. The static friction between the end faces 10B, 11B of the dog elements 10A, 11A is lowered via the reduction of the engagement force. Simultaneously, by raising the torque present at the form-locking shift element A, F, the static friction between the end faces 10B, 11B is overcome and the differential speed between the shift-element halves 10, 11 increases to an extent that enables the positive engagement between the dog elements 10A, 11A to be established.

FIG. 3*d* shows an operating condition of the form-locking shift element A, F, in which a positive engagement between the shift-element halves 10, 11 is present with a partial axial overlap of the dog elements 10A, 11A. Such an operating condition is present during a disengagement process as well as during an engagement process of the form-locking shift element A, F.

The torque acting on the shift element A, F and the coefficients of friction of flanks 10C, 11C of the shift element A, F yield a static friction force, which acts between the flanks 10C, 11C. If the actuation force acting on the shift-element halves 10, 11 in the disengagement direction or in the engagement direction of the form-locking shift element A, F is too low in relation to the static friction force between the flanks 10C, 11C of the dog elements 10A, 11A, so-called flank clamping occurs. During flank clamping, the axial relative actuating movement between the shift-element halves 10, 11 in the engagement direction or in the disengagement direction is zero, and so the demanded operating condition change of the form-locking shift element A, F does not take place. In order to prevent or release such a flank clamping, the actuation force present at the shift element A, F, for example, is raised and/or the particular torque present at the form-locking shift element A, F is reduced to the extent necessary for this purpose.

The completely engaged operating condition of the form-locking shift element A, F is represented in FIG. 3e, in which the full overlap between the dog elements 10A, 11A in the axial direction x is present.

FIGS. 4a-4f each show a representation of a form-locking shift element A, F similar to the form-locking shift element shown FIG. 3a. In this case, the dog elements 10A, 11A of the shift-element halves 10, 11, which are arranged next to one another in the circumferential direction of the shift-element halves 10, 11, each have a different length in the axial direction x. In the following, the first shift-element half 10 has longer dog elements 10A1 and shorter dog elements 10A2, while the second shift-element half 11 has longer dog elements 11A1 and shorter dog elements 11A2.

This embodiment of the form-locking shift elements A, F offers the advantage that the positive engagement between the shift-element halves 10, 11 is established at higher differential speeds between the shift-element halves 10, 11 than with the embodiment of the form-locking shift elements A, F represented in FIGS. 3a-3e. In contrast thereto, the embodiment of the form-locking shift element A, F according to FIGS. 4a-4f is less robust against rattling as compared to the embodiment of the form-locking shift element A, F according to FIGS. 3a-3e.

The shift element A, F has further operating conditions, due to the combination of the longer dog elements 10A1, 11A1 and the shorter dog elements 10A2, 11A2, in addition to the operating conditions of the form-locking shift element A, F described with reference to FIGS. 3a-3e. The further operating conditions will be described in greater detail in the following description of FIGS. 4a-4f.

Initially, the completely disengaged operating condition of the shift element A, F is represented in FIG. 4a. FIG. 4b shows the operating condition of the form-locking shift element A, F during a rattling operation. During the rattling operation, the shift-element halves 10, 11 glide off of one another at end faces 1061, 11B1 of the longer dog elements 10A1, 11A1 in the circumferential direction. Therefore, the positive engagement between the shift-element halves 10, 11 is not established. This rattling operation is preventable or ended to the extent described with reference to FIG. 3b by reducing the differential speed between the shift-element halves 10, 11.

Moreover, FIG. 4c and FIG. 4d each show a tooth-on-tooth position, which prevents the establishment of the positive engagement between the shift-element halves 10, 11. In the operating condition of the form-locking shift element A, F represented in FIG. 4c, the tooth-on-tooth position is between the end faces 1061, 11B1 of the longer dog elements 10A1, 11A1. In contrast thereto, the tooth-on-tooth position between the shift-element halves 10, 11 in the operating condition of the form-locking shift element A, F represented in FIG. 4d is between the end faces 11B1 of the longer dog elements 11A1 of the second shift-element half 11 and the end faces 1062 of the shorter dog elements 10A2 of the first shift-element half 10.

Regardless of the particular tooth-on-tooth position between the shift-element halves 10, 11, the tooth-on-tooth position is releasable or preventable in the way described with respect to FIG. 3c.

FIG. 4e shows an intermediate operating condition of the form-locking shift element A, F between the completely disengaged operating condition and the completely engaged operating condition of the form-locking shift element A, F. During this intermediate operating condition, flank clamping—which is described in greater detail above—between the dog elements 10A1, 10A2 of the first shift-element half 10 and the dog elements 11A1, 11A2 of the second shift-element half 11 occurs. The flank clamping is preventable or releasable to the extent described with reference to FIG. 3d to disengage or engage the form-locking shift element A, F to the demanded extent.

The completely engaged operating condition of the form-locking shift element A, F is represented in FIG. 4f.

An advantageous approach is described in the following, by which an actuating-travel range between the two shift-element halves 10, 11 of the form-locking shift element A, F according to FIG. 3a is determined, within which the tooth-on-tooth position shown in FIG. 3c occurs. For this purpose, the form-locking shift element A, F is initially acted upon, starting from the disengaged operating condition shown in FIG. 3a, with an actuation force towards the engaged operating condition shown in FIG. 3e. As the operating time increases, the movable shift-element half 10 is displaced in the axial direction x toward the shift-element half 11, which is axially fixed.

If it is determined by the particular sensor associated with the form-locking shift element A, F that the actuating movement of the shift-element half 10 is zero, a timer is started and, thereafter, a check is carried out to determine whether the shift-element half 10 has remained in the current position for a predefined time period. Additionally, the progression of the signal of the sensor is observed. If the sensor signal does not fall below a predefined lower limit for the predefined time period and does not exceed a likewise predefined upper limit, a certain stability of the sensor signal is established and the intermediate position of the form-locking shift element A, F is evaluated as sufficiently stable. This evaluation result triggers the start of an adaptation, by which a predefined standard actuating-travel range is adapted to the real system, which has the form-locking shift element A, F as well as the particular associated sensor.

Initially, a ratio between the engagement force present at the form-locking shift element A, F and acting in the axial direction, and a radial force present at the shift element A, F is calculated. Therefore, it is very likely that the shift element remains in the intermediate position due to a tooth-on-tooth position or due to a flank clamping and is not transferred into the engaged operating condition. In this case, the radial force results from the torque present at the form-locking shift element A, F. Additionally, a check is carried out to determine whether the shift element A, F has left the intermediate position, from which the shift element initially could not be transferred into the engaged condition, using the above-described approach for releasing a tooth-on-tooth position or using the approach for releasing a flank clamping.

In the present case, the ratio between the axial actuation force and the radial force present at the form-locking shift element A, F is within a value range facilitating a tooth-on-tooth position. Moreover, the intermediate position of the form-locking shift element A, F was released by implementing the approach by which a tooth-on-tooth position is ended. For this reason, a tooth-on-tooth position is determined for the intermediate position.

A value range of the ratio between the axial force and the radial force facilitating a tooth-on-tooth position represents force ratios, in each case, at which the static friction force between the end faces 10B, 11B of the shift-element halves 10, 11 is greater than the radial force resulting from the applied torque. In such an operating condition of the form-locking shift element A, F, the applied torque is transmitted via the force-fit connection between the shift-element halves 10, 11, which is present at the end faces 10B, 11B, wherein the relative turning motion between the shift-element halves 10, 11 is then zero.

Moreover, a check is carried out, before the actuating-travel range between the two shift-element halves 10, 11 of the form-locking shift element A, F is established, to determine whether the adaptation for the first detected tooth-on-tooth position takes place, whether some tooth-on-tooth positions have already been detected, or if a certain number of tooth-on-tooth positions greater than a threshold value have already been determined.

If the adaptation is carried out on the basis of the first detected tooth-on-tooth position, the minimum value of the signal of the sensor and the maximum value of the signal of the sensor form the limits of the actuating-travel range or the tooth-on-tooth range. These values are stored for the interim and are utilized as comparison values for subsequent adaptations.

The above-described approach is carried out every time a standstill is detected using the sensor of the shift-element half 10 movable in the axial direction x during an engagement process of the form-locking shift element A, F. If a tooth-on-tooth position is very likely detected on the basis of the aforementioned test criteria, the buffered limits of the actuating-travel range are compared to the minimum value of the signal of the sensor and the maximum value of the sensor, which were determined for the currently ascertained tooth-on-tooth position of the form-locking shift element A, F.

The actuating-travel range or the tooth-on-tooth range is enlarged if the current values of the signals of the sensors are less than or greater than the previous limits of the actuating-travel range. Initially, a check is carried out, however, to determine whether the previous tooth-on-tooth range and the newly determined actuating-travel range do not lie too far apart from one another. If this should be the case, the currently determined tooth-on-tooth range and the already learned tooth-on-tooth range or actuating-travel range are deleted.

If a tooth-on-tooth position is determined during a further engagement process of the form-locking shift element A, F, the minimum and maximum values of the signal of the sensor determined therefor are stored as new limits of the actuating-travel range.

This approach is carried out for as long as the number of detected tooth-on-tooth positions is less than a predefined value.

If the actuating-travel range between the two shift-element halves 10, 11 of the form-locking shift element A, F has already been determined and adapted for a defined number of detected tooth-on-tooth positions greater than the predefined value, the minimum and maximum values of the signal of the sensor determined for a detected tooth-on-tooth position are compared to the actuating-travel range. If the currently determined minimum and/or maximum value(s) of the signal of the sensor lie(s) outside the actuating-travel range, the limits of the actuating-travel range are each enlarged by an offset in the appropriate direction. This continues until the lower limit and the upper limit of the actuating-travel range have a maximum distance from one another.

If this is the case and if the upper limit of the actuating-travel range is to be raised, the lower limit is reduced by the same increment, or if the lower limit of the actuating-travel range is to be lowered, the upper limit is increased by the same increment. As a result, the demanded adaptation is implemented without further enlarging the width of the actuating-travel range.

FIGS. 5a-5d show a graphic representation of an adaptation process of a predefined upper actuating-travel range SWO and a predefined lower actuating-travel range SWU with respect to the real transmission 3. With reference to FIGS. 5a-5d, it is described in greater detail in the following how reference values LS and LS1 of the sensor of shift element A, F according to FIG. 4a are unambiguously associated with the upper actuating-travel range SWO or with the lower actuating-travel range SWU, respectively. The upper actuating-travel range SWO defines an actuating-travel range of the movable first shift-element half 10 with respect to the second shift-element half 11, which is fixed in the axial direction x, within which a tooth-on-tooth position represented in FIG. 4c between the axially longer dog elements 10A1, 11A1 of the shift-element halves 10, 11 is likely. Simultaneously, the lower actuating-travel range SWU of the first shift-element half 10 defines an actuating-travel range, within which tooth-on-tooth positions represented in FIG. 4d likely occur between the longer dog element 10A1 of the first shift-element half 10 and the shorter dog element 11A2 of the second shift-element half 11 or between the longer dog element 11A1 of the second shift-element half 11 and the shorter dog element 10A2 of the first shift-element half 10.

The actuating-travel ranges SWO, SWU shown in FIG. 5a, which are predefined standard actuating-travel ranges, are the starting point. The two actuating-travel ranges SWO, SWU have a smaller width than the overall actuating-travel range of the shift-element half 10, which extends from 0% to 100%. The form-locking shift element A, F is completely disengaged if the actuating travel is 0%. If the shift-element half 10 has been completely displaced and its actuating travel is 100%, the form-locking shift element A, F has been completely engaged. The predefined upper actuating-travel range SWO has a lower limit SWOL and an upper limit SWOU. Moreover, the width of the predefined lower actuating-travel range SWU is defined by the lower limit SWUL and by the upper limit SWUU. The lower limit SWUL of the lower actuating-travel range SWU and the upper limit SWOU of the upper actuating-travel range SWO are established in such a way that the upper actuating-travel range SWO and the lower actuating-travel range SWU overlap.

The vertical lines LS plotted in the upper actuating-travel range SWO and the further vertical lines LS1 plotted in the overlap area of the two actuating-travel ranges SWO, SWU correspond to values of the signal of the sensor that were determined for detected tooth-on-tooth positions of the form-locking shift element A, F according to FIG. 4a.

Since the sensor values corresponding to the lines LS are unambiguously associated with the upper actuating-travel range SWO, it is assumed that the tooth-on-tooth positions each correspond to the tooth-on-tooth position between the longer dog elements 10A1, 11A1 represented in FIG. 4c. In contrast thereto, the sensor values corresponding to the lines LS1, which were also determined for tooth-on-tooth positions of the form-locking shift element A, F, are not unambiguously associated with the upper actuating-travel range SWO or with the lower actuating-travel range SWU.

For this reason, a safety actuating-travel range towards the engaged operating condition of the form-locking shift element A, F is defined starting from the lowest sensor value LSmin. The safety actuating-travel range is composed, in the present case, of a first actuating-travel range PTO and a safety range SOFF. The first actuating-travel range PTO has such a width that scatterings of the signal of the sensor during the determination of the tooth-on-tooth position between the shift-element halves 10 do not bring about a faulty assignment or adaptation. These deviations result from sensor tolerances as well as from so-called gear clearance. The gear clearance causes the form-locking shift element A, F to be displaced, in its entirety, in the axial direction during the operation of the transmission 3 with respect to the associated sensor depending on the particular load present at the transmission 3, which prevents a precise determination of the exact position for the tooth-on-tooth position.

Figure 5B:
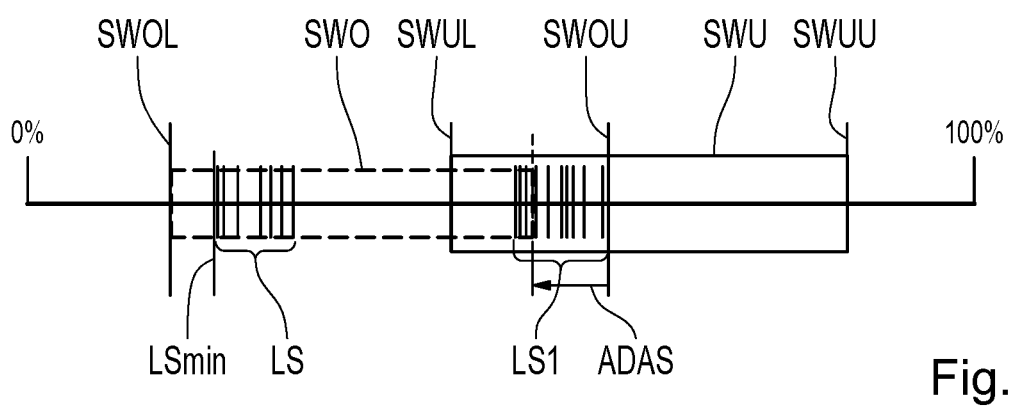
FIGS. 5b-5d each show a representation corresponding to FIG. 5a, wherein limits of the first and second actuating-travel ranges are successively adapted such that sensor signals corresponding to tooth-on-tooth positions are increasingly assigned to only one of the first and second actuating ranges.

In a first step, the upper limit SWOU of the upper actuating-travel range SWO is displaced towards the lower limit SWOL of the upper actuating-travel range SWO by an adaptation step ADAS to the extent shown in FIG. 5a and FIG. 5b. As a result, the width of the overlap area between the two actuating-travel ranges SWO, SWU is reduced. The adaptation step ADAS is an applicable value. The new upper limit SWOUn of the upper actuating-travel range SWO is outside the safety actuating-travel range.

Due to this approach, a portion of the sensor values LS1 are now associated only with the lower actuating-travel range SWU, while the remaining portion of the sensor values LS1 are still located in the overlap area between the upper actuating-travel range SWO and the lower actuating-travel range SWU.

Thereafter, a check is carried out to determine whether a further shortening of the upper actuating-travel range SWO by the adaptation step ADAS is possible without the new upper limit SWOUn1 of the upper actuating-travel range SWO being located within the safety actuating-travel range as a result.

Figure 5C:
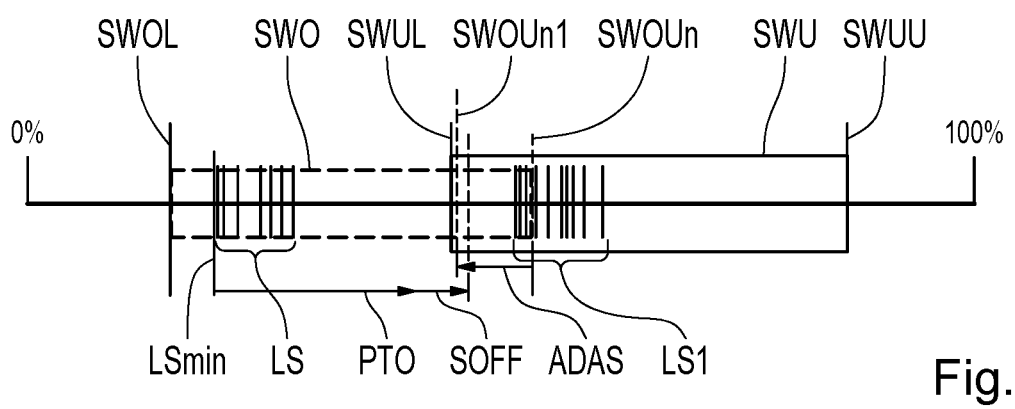

As shown in FIG. 5c, the re-shortening of the upper actuating-travel range SWO by the adaptation step ADAS would result in the new upper limit SWOUn1 of the upper actuating-travel range SWO being located within the safety actuating-travel range.

Figure 5D:
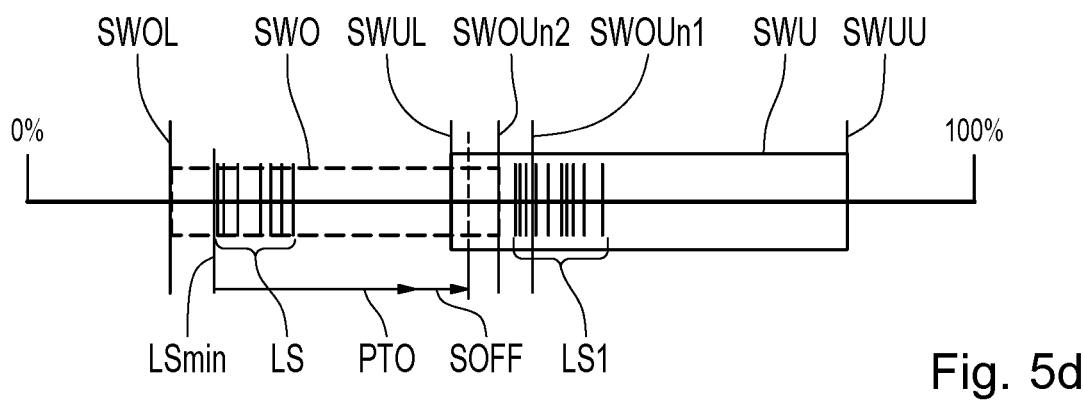

Since such an adaptation of the upper actuating-travel range SWO would open up the possibility that sensor values determined for tooth-on-tooth positions are not unambiguously associated with the upper actuating-travel range SWO or with the lower actuating-travel range SWU, the distance between the new upper limit SWOUn of the upper actuating-travel range SWO and the safety actuating-travel range is determined. Thereafter, the width of the adapted actuating-travel range SWO is reduced only by half the distance between the new upper limit SWOUn of the upper actuating-travel range SWO and the safety actuating-travel range towards the lower limit SWOL of the upper actuating-travel range SWO. The upper actuating-travel range SWO, which has been shortened by this extent, is shown in FIG. 5d. The upper actuating travel range SWO is now delimited by the lower limit SWOL and by the new upper limit SWOUn2.

As a result of the latter-described adaptation step of the upper actuating-travel range SWO, all sensor values LS1 are now associated with the lower actuating-travel range SWU, while the sensor values LS are still associated with the upper actuating-travel range SWO.

If further tooth-on-tooth positions are determined, which are located in the overlap area between the adapted upper actuating-travel range SWO and the lower actuating-travel range SWU according to FIG. 5b, the above-described approach is carried out again. The adaptation of the upper actuating-travel range SWO represented in FIG. 5c towards the actuating-travel range SWO represented in FIG. 5d is repeated until all sensor values LS1 are associated with the lower actuating-travel range SWU and all sensor values LS are associated with the upper actuating-travel range SWO.

Figure 6A:
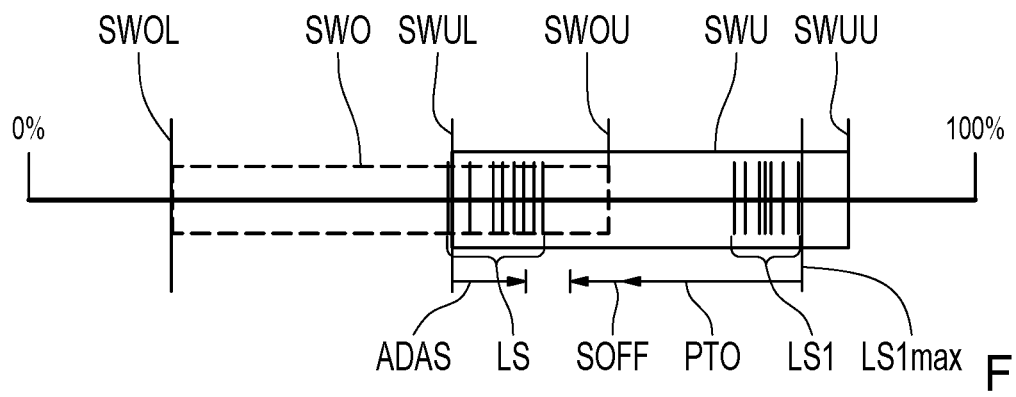

FIG. 6a shows a representation corresponding to FIG. 5a. The two predefined actuating-travel ranges SWO, SWU represent the start point for the approach described in greater detail in the following. Initially, all the sensor values LS determined for certain tooth-on-tooth positions are arranged in the overlap area between the upper actuating-travel range SWO and the lower actuating-travel range SWU. All the sensor values LS1 determined for the tooth-on-tooth positions are located in the lower actuating-travel range SWU.

Figure 6B:
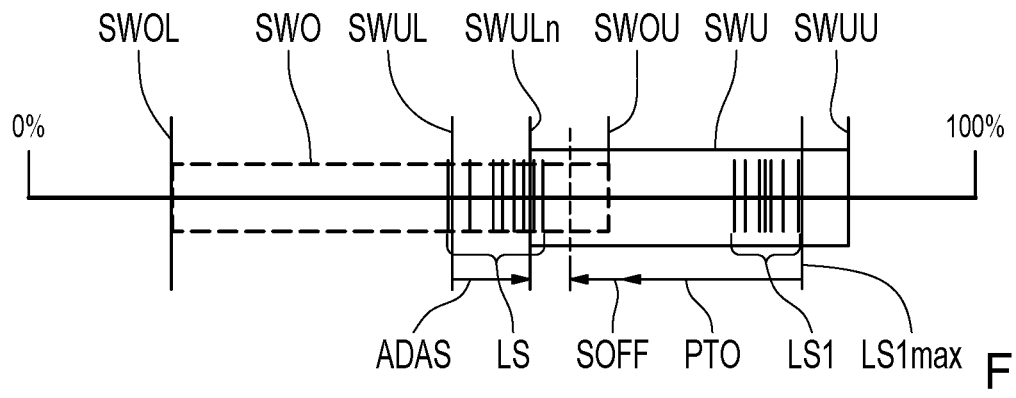
Figure 6C:
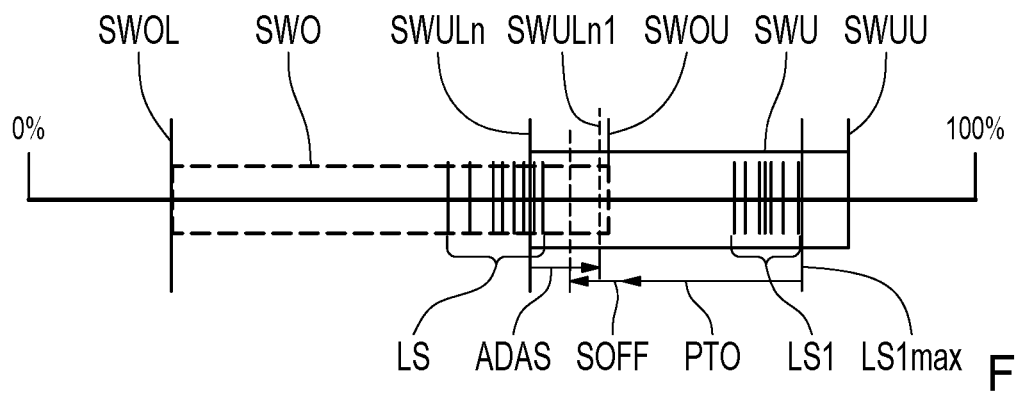
Figure 6D:
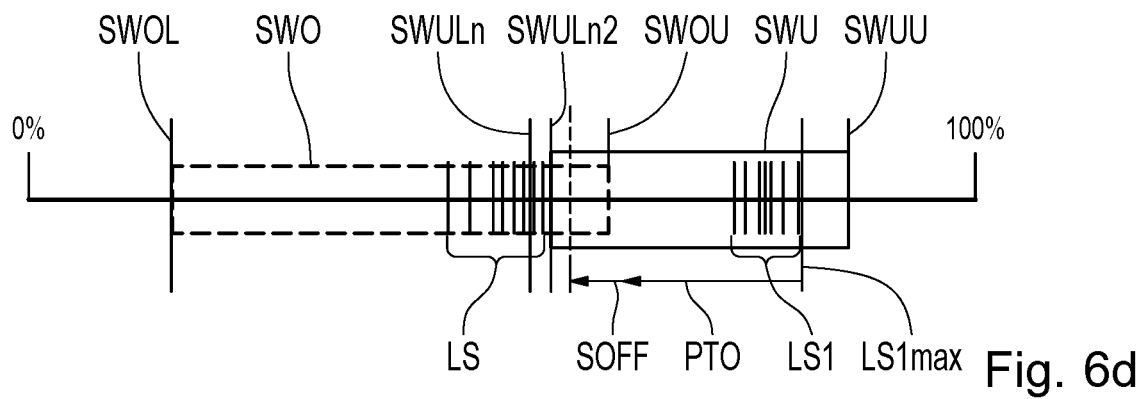

In the presence of such a scenario, the safety actuating-travel range is initially established starting from the highest sensor value LS1max. Thereafter, a check is carried out to determine whether a reduction of the width of the lower actuating-travel range SWU associated with the displacement of the lower limit SWUL of the lower actuating-travel range SWU by the adaptation value ADAS results in the new lower limit SWULn being located within the safety actuating-travel range. Since this test step yields a negative query result, the width of the lower actuating-travel range SWU is reduced. The new lower actuating-travel range SWU is represented in FIG. 6b.

Since a portion of the sensor values LS are still located in the overlap area between the upper actuating-travel range SWO and the lower actuating-travel range SWU, a check is carried out to determine whether a further reduction of the width of the lower actuating-travel range SWU by the adaptation value ADAS is possible. In the present case, a further reduction of the width of the lower actuating-travel range SWU results in the further new lower limit SWULn1 of the lower actuating-travel range SWU being located within the safety actuating-travel range. Therefore, a further reduction of the width by the adaptation value ADAS is not carried out.

Thereafter, the axial distance between the new lower limit SWULn of the lower actuating-travel range SWU and the safety actuating-travel range is determined. Thereafter, the new lower limit SWULn of the lower actuating-travel range SWU is displaced by half the distance between the new lower limit SWULn of the lower actuating-travel range SWU and the safety actuating-travel range and the width of the lower actuating-travel range SWU is reduced by this value. The lower actuating-travel range SWU is now delimited by the lower limit SWULn2, which has been adapted once more, and the upper limit SWUU.

In the present case, all sensor values LS are now associated with the upper actuating-travel range SWO and all sensor values LS1 are associated with the lower actuating-travel range SWU. For this reason, a further adaptation of the actuating-travel ranges SWO, SWU is refrained from until sensor values that correspond to tooth-on-tooth positions are located in the overlap area between the upper actuating-travel range SWO and the adapted lower actuating-travel range SWU.

Figure 7A:
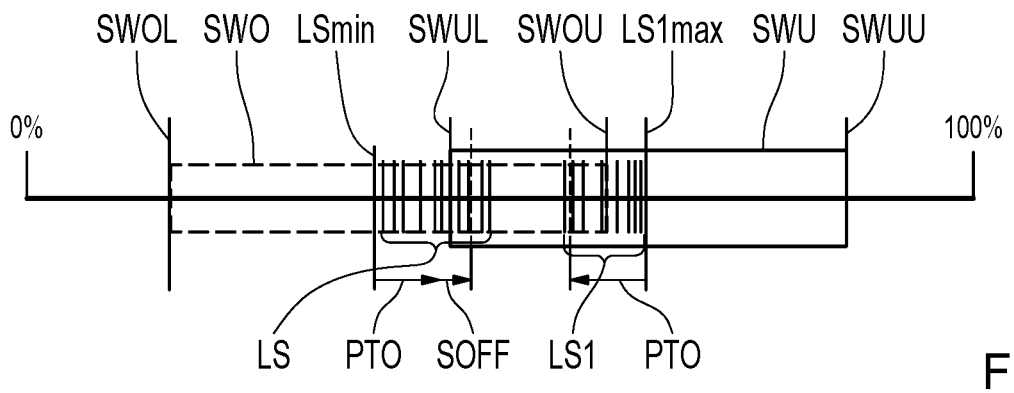
FIGS. 7a-7f each show a representation corresponding to FIGS. 6a-6d of a further approach for determining actuating-travel ranges for tooth-on-tooth positions of a shift element according to FIG. 4a with the desired accuracy.

FIG. 7a shows a representation of the predefined actuating-travel ranges SWO, SWU corresponding to FIG. 5a. A portion of the determined sensor values LS are located only in the upper actuating-travel range SWO and the other portion is located in the overlap area between the upper actuating-travel range SWO and the lower actuating-travel range SWU. Simultaneously, a portion of the sensor values LS1 are located in the lower actuating-travel range SWU and the other portion is located in the overlap area between the two actuating-travel ranges SWO, SWU.

In order to be able to associate the sensor values LS only to the upper actuating-travel range SWO as well as the sensor values LS1 to only the lower actuating-travel range SWU, a check is initially carried out to determine whether the safety actuating-travel range, starting from the minimum sensor value LSmin, is spaced apart from a further safety actuating-travel range extending from the maximum sensor value LS1max across only the width of the first actuating-travel range PTO towards the upper actuating-travel range SWO.

In the present case, this query yields a positive result and the center between the minimum sensor value LSmin and the maximum sensor value LS1max is determined. Thereafter, the upper limit SWOU of the upper actuating-travel range SWO is displaced towards the lower limit SWOL of the upper actuating-travel range SWO and the width of the upper actuating-travel range SWO is reduced. To the same extent, the lower limit SWUL of the lower actuating-travel range SWU is displaced towards the upper limit SWUU of the lower actuating-travel range SWU, and the lower actuating-travel range SWU or its width is reduced. The new upper limit SWOUn of the upper actuating-travel range SWO and the new lower limit SWULn of the lower actuating-travel range SWU coincide to the extent represented in FIG. 7b.

The new limit SWULn of the lower actuating-travel range SWU and the new limit SWOUn of the upper actuating-travel range SWO are spaced apart from the center between the minimum sensor value LSmin and the maximum sensor value LS1max in the direction of the upper limit SWUU of the lower actuating-travel range SWU by a safety offset value. Therefore, incorrect assignments of further determined tooth-on-tooth positions are easily avoidable.

Figure 7B:
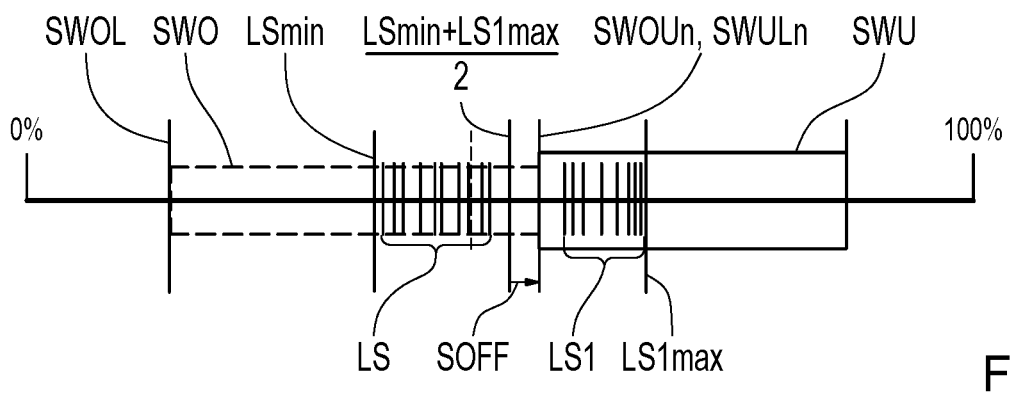
Figure 7C:
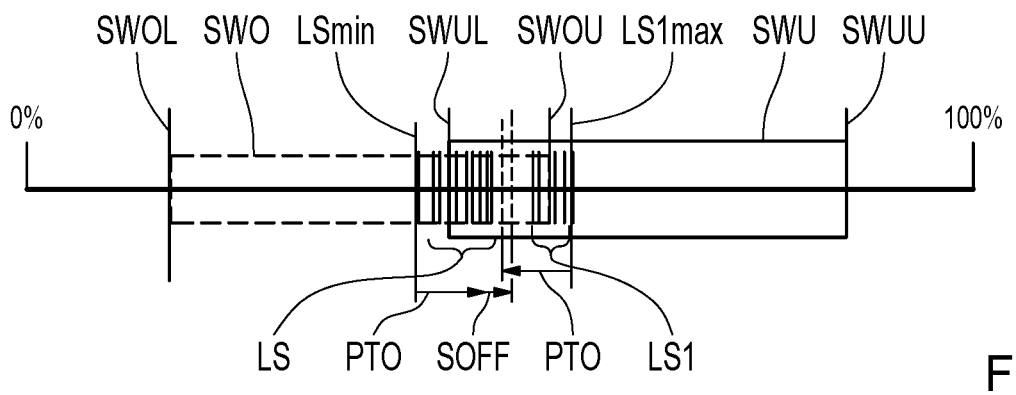

FIG. 7c shows a further scenario, in which the distance between the minimum sensor value LSmin and the maximum sensor value LS1max is substantially less than in the scenario on which the representation according to FIG. 7a is based. The distance between the minimum sensor value LSmin and the maximum sensor value LS1max is such that the safety actuating-travel range and the further safety actuating-travel range overlap. For this reason, the approach described with respect to FIG. 7a and FIG. 7b is not applicable in the scenario on which the representation according to FIG. 7c is based, in order to prevent, by way of an adaptation, incorrect assignments of tooth-on-tooth positions of the shift element A, F according to FIG. 4a.

Figure 7D:
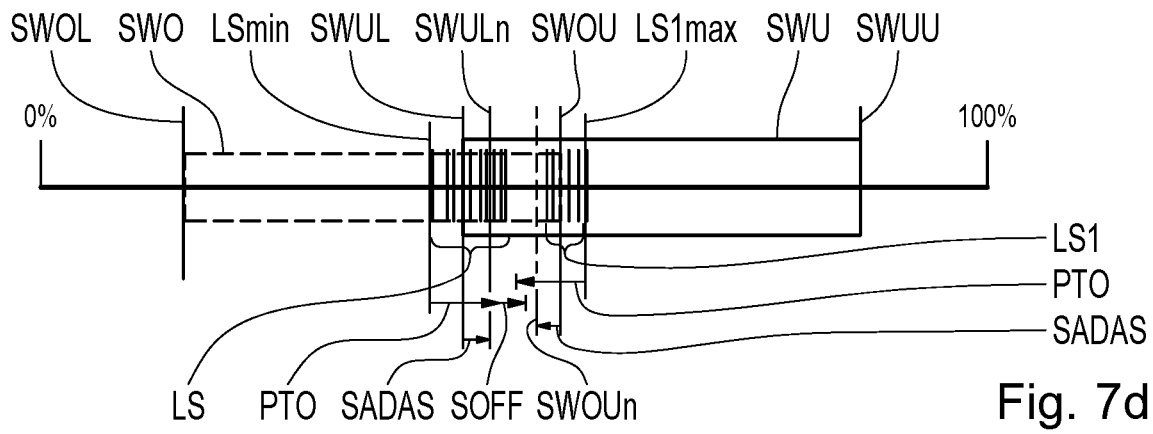
Figure 7E:
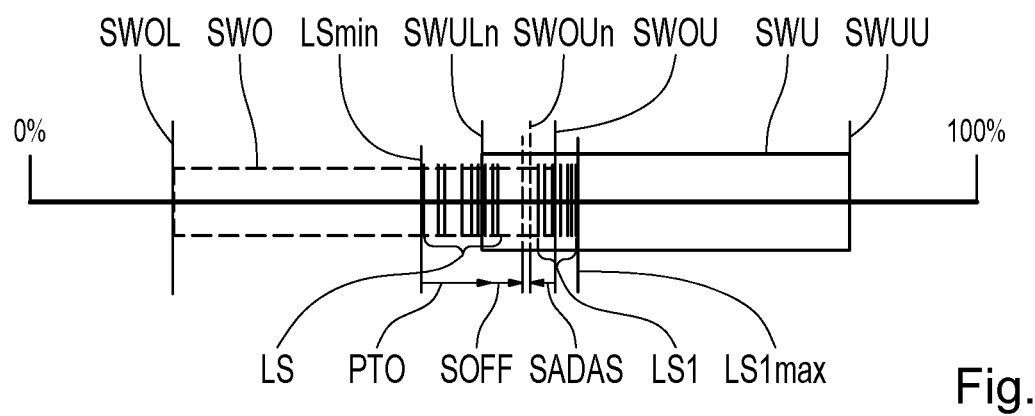

For this reason, the lower limit SWUL of the lower actuating-travel range SWU is initially raised by a small adaptation step SADAS and the width of the lower actuating-travel range SWU is reduced. The adapted lower actuating-travel range SWU is shown in FIG. 7d.

Figure 7F:
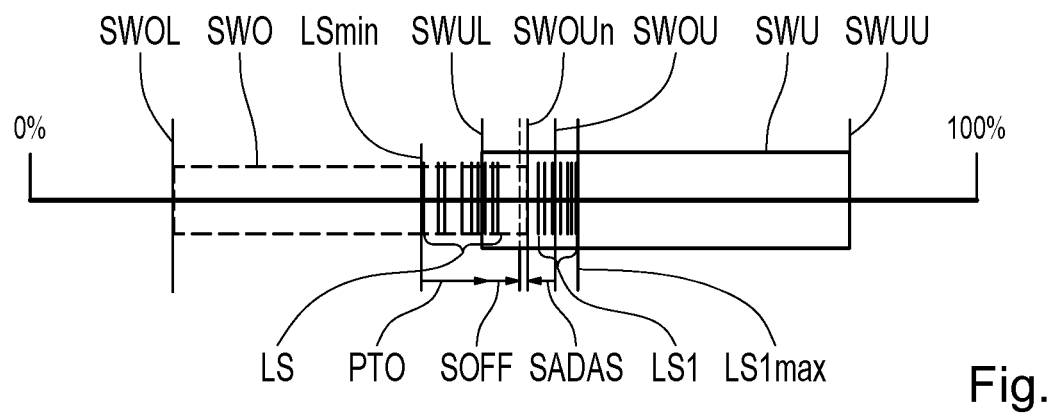

Thereafter, a check is carried out to determine whether a displacement of the upper limit SWOU of the upper actuating-travel range SWO by the small adaptation step SADAS towards the lower limit SWOL of the upper actuating-travel range SWO results in the new upper limit SWOUn of the upper actuating-travel range SWO being located within the safety actuating-travel range. Since this check yields a negative query result, the upper limit SWOU of the upper actuating-travel range SWO is reduced by the small adaptation step SADAS. This adaptation step results in all sensor values LS1 being associated with the lower actuating-travel range SWU. The upper actuating-travel range SWO of the upper actuating-travel range SWO reduced to the above-described extent is represented in FIG. 7f.

Thereafter, the approach described with respect to FIGS. 6a-6d is carried out until all sensor values LS are associated only with the upper actuating-travel range SWO.

Figure 8A:
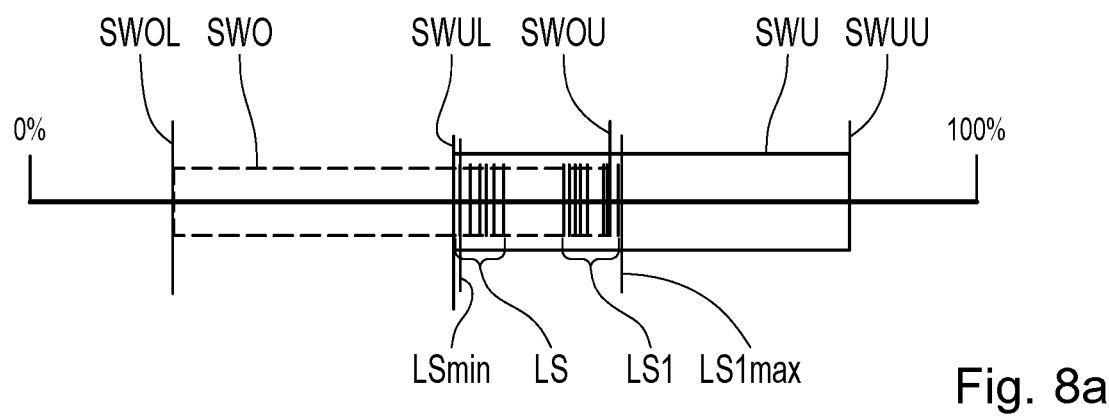
Figure 8B:
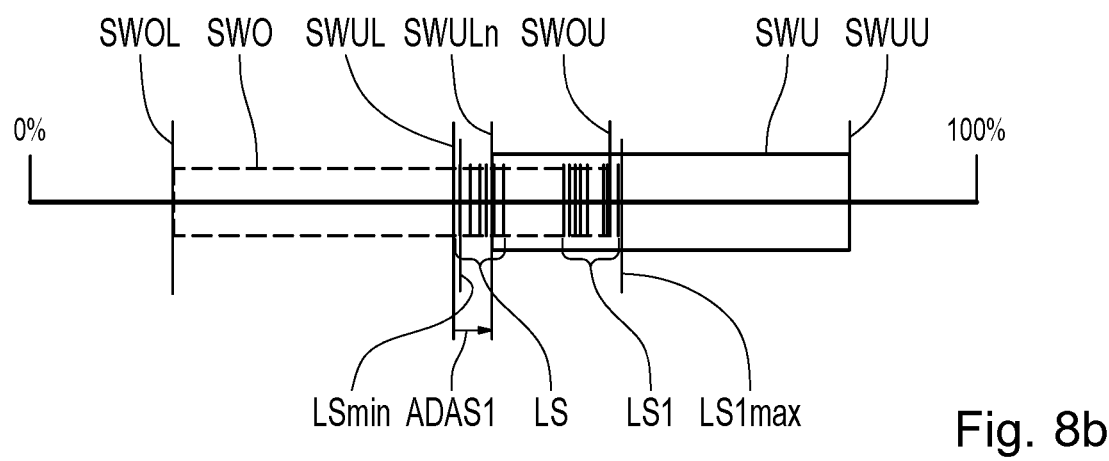

FIG. 8a shows a representation of the predefined actuating-travel ranges SWO, SWU corresponding to FIG. 5a. In the scenario used as the basis for FIG. 8a, all determined sensor values LS and LS1 are located in the overlap area between the two predefined actuating-travel ranges SWO, SWU. Starting from this scenario, the lower limit SWUL of the lower actuating-travel range SWU is displaced by the extent represented in FIG. 8b by a further adaptation step ADAS1 towards the upper limit SWUU and, therefore, the width of the lower actuating-travel range SWU is reduced. Due to this measure, a portion of the sensor values LS are now located only in the upper actuating-travel range SWO, while the other portion of the sensor values LS, as well as the sensor values LS1, are located in the overlap area.

Thereafter, the adaptation is carried out further to the extent described with respect to FIGS. 5a-5d, in order to be able to unambiguously assign the sensor values LS and LS1 to the upper actuating-travel range SWO or to the lower actuating-travel range SWU, respectively.

On the basis of the above-described adaptation of the tooth-on-tooth range of the shift element 10 according to FIG. 3a or of the tooth-on-tooth ranges of the form-locking shift element 10 according to FIG. 4a, an extent of overlap between the shift-element halves 10, 11 is determined starting from the tooth-on-tooth range towards completely engaged operating condition of the form-locking shift element A, F. This knowledge offers the possibility of applying a torque, which is to be transmitted via the form-locking shift element, at the form-locking shift element A, F already in the presence of a defined extent of partial overlap between the shift-element halves 10, 11, although the form-locking shift element is not yet in its completely engaged operating condition. This is advantageous, in particular, when the form-locking shift element A, F is not transferrable out of such a partial-overlap condition into its completely engaged operating condition within desirably short shift times.

Previously, attempts were made to release a seized form-locking shift element in a partially overlapped operating condition with the above-described escalation steps for releasing a tooth-on-tooth position or a flank clamping. However, these escalation steps adversely affect a shift quality and extend a shift time, which is undesirable.

If an extent of overlap between the shift-element halves 10, 11 is determined that is sufficient for the transmission of a torque to be applied to the form-locking shift element, then, in the present case, the completely engaged operating condition of the form-locking shift element A, F is reported to a transmission control unit of the transmission 3. As a result, the torque to be transmitted is applied to the form-locking shift element. Simultaneously, it is reported to the transmission control unit that the form-locking shift element A, F is only in a partially overlapped operating condition. As a result of this information, an adaptation of the end positions of the movable shift-element half 10 is deactivated. Simultaneously, a check is carried out to determine whether the movable shift-element half 10 is actuated towards the engaged operating condition of the form-locking shift element A, F and may also be moving towards the second end position.

If it is detected, however, that the movable shift-element half 10 is displaced towards its first end position, i.e., towards the disengaged operating condition of the form-locking shift element A, F, the torque present at the form-locking shift element A, F is reduced. Additionally, the actuation force acting in the engagement direction is increased, in order to transfer the form-locking shift element A, F, to the demanded extent, into its completely engaged operating condition.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

1 vehicle drive train
2 prime mover
3 transmission
4 driven end
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 1061, 1062 end face of the dog element
10C flank of the dog element
11B, 1161, 1162 end face of the dog element
11C flank of the dog element
"1" to "9" transmission ratio for forward driving
"R" transmission ratio for travel in reverse
A to F shift element
ADAS adaptation step
ADAS1 further adaptation step
LS, LS1 sensor values
LS1 max maximum sensor value
LSmin minimum sensor value
P1 to P4 planetary gear set
PTO first actuating-travel range
SADAS small adaptation step
SOFF safety range
SWO upper actuating-travel range
SWOL, SWOU limits of the upper actuating-travel range
SWU lower actuating-travel range
SWUL, SWUU limits of the lower actuating-travel range

The invention claimed is:

1. A method for determining an operating condition of a form-locking shift element (A, F), the form-locking shift element (A,F) comprising a first shift-element half (10) and a second shift-element half (11) which are engageable with each other in a form-locking manner, at least the first shift-element half (10) being displaceable between a first end position, corresponding to a disengaged operating condition of the form-locking shift element (A, F), and a second end position, corresponding to an engaged operating condition of the form-locking shift element (A, F), the method comprising:

monitoring a current position of the first shift-element half (10) with a sensor; and determining an operating condition of the form-locking shift element (A, F) in which the form-locking shift element (A,F) is sufficiently engaged to transmit a torque at the form-locking shift element (A, F) when a value of a signal generated by the sensor is greater than an applicable value for a defined time period and when the first shift-element half (10) is actuated and displaced towards the second end position, wherein the applicable value corresponds to a defined overlap between the first and second shift-element halves (10, 11), the defined overlap being less than an overlap between the first and second shift-element halves (10, 11) when the first shift-element half (10) is in the second end position.

2. The method of claim 1, further comprising, upon detecting a movement of the first shift-element half (10) towards the first end position:

reducing the torque at the form-locking shift element (A, F); and increasing an engagement force acting in the engagement direction.

3. The method of claim 1, wherein the applicable value is variable depending on the torque at the form-locking shift element (A, F).

4. The method of claim 1, wherein a tooth-on-tooth position is detected when:

the sensor detects that an actuating movement of the first shift-element half (10) in the engagement direction is zero within an actuating-travel range of the first shift-element half (10) between the disengaged operating condition and the engaged operating condition of the form-locking shift element (A, F);

a ratio between an engagement force applied to the form-locking shift element (A, F) and a radial force acting on the first and second shift-element halves (10, 11), resulting from the torque at the form-locking shift element (A, F), is within a value range facilitating a tooth-on-tooth position; and the actuating movement of the first shift-element half (10) in the engagement direction detected with the sensor is greater than zero after a reduction of the engagement force, after an increase of the torque at the form-locking shift element (A, F), or after both the reduction of the engagement force and the increase of the torque at the form-locking shift element (A, F).

5. The method of claim 4, further comprising determining the actuating-travel range between the first and second shift-element halves (10, 11) when:

the actuating movement of the first shift-element half (10) in the engagement direction equal to zero is detected with the sensor; and the value of the signal generated by the sensor within a time period, which is equal to a predefined time period or is longer than the predefined time period, is greater than or equal to a predefined lower threshold value and less than or equal to a predefined upper threshold value.

6. The method of claim 5, wherein determining the actuating-travel range comprises, when a tooth-on-tooth position is first determined, setting a minimum value of the signal generated by the sensor as a lower limit and a maximum value of the signal generated by the sensor form as an upper limit of the actuating-travel range between the first and second shift-element halves (10, 11), within which a tooth-on-tooth position is expected.

7. The method of claim 6, further comprising calculating an updated actuating-travel range by changing the lower and upper limits of the actuating-travel range when a minimum or maximum value of the signal generated by the sensor for each tooth-on-tooth position detected during further determinations of the actuating-travel range between the first and second shift-element halves (10, 11) deviates from the respective lower or upper limit of the actuating-travel range by more than an absolute value of a threshold value.

8. The method of claim 6, further comprising changing the lower and upper limits of the actuating-travel range when a distance between the actuating-travel range and an updated actuating-travel range defined by current values of the signal generated by the sensor is less than or equal to a predefined threshold value.

9. The method of claim 6, wherein, when a distance between the actuating-travel range and an updated actuating-travel range defined by current values of the signal generated by the sensor is greater than a predefined threshold value and when the actuating-travel range is determined based on a number of detected tooth-on-tooth positions that is less than a threshold value, the method further comprises:
discarding the lower and upper limits of the actuating-travel range; and
determining a new actuating-travel range when a subsequent tooth-on-tooth position is determined.

10. The method of claim 6, further comprising enlarging the actuating-travel range, by changing the lower and upper limits based on the values of the signal generated by the sensor, until a distance between the lower and upper limits of the actuating-travel range is greater than or equal to a predefined maximum value.

11. The method of claim 6, further comprising:
comparing the minimum value of the signal generated by the sensor and the maximum value of the signal generated by the sensor for each tooth-on-tooth position to the respective lower or upper limit of the actuating-travel range, the actuating-travel range being determined based on a number of ascertained tooth-on-tooth positions greater than a threshold value; and
changing the lower and upper limits of the actuating-travel range by an offset when the minimum or maximum value of the signal generated by the sensor deviates from the respective lower or upper limit of the actuating-travel range by more than an absolute value of a threshold value.

12. The method of claim 11, wherein, when a distance between the lower and upper limits of the actuating-travel range reaches or exceeds a maximum distance and when the minimum value of the signal generated by the sensor or the maximum value of the signal generated by the sensor is outside the actuating-travel range, the method further comprises:

changing the lower and upper limits of the actuating-travel range such that the distance between the lower and upper limits of the actuating-travel range does not exceed the maximum distance.

13. The method of claim 1, wherein each of the first and second shift-element halves (10, 11) has a first group of dog elements (10A1, 11A1) and a second group of dog elements (10A2, 11A2), wherein the dog elements of the first group of dog elements (10A1, 11A1) are longer in an actuation direction of the first shift-element half (10) than the dog elements of the second group of dog elements (10A2, 11A2), and the dog elements of the first and second groups of dog elements (10A1, 10A2, 11A1, 11A2) of each of the first and second shift-element halves (10, 11) alternate in the circumferential direction of the first and second shift-element halves (10, 11), and the method further comprises:
determining two actuating-travel ranges starting from two predefined actuating-travel ranges (SWO, SWU) between the first and second shift-element halves (10, 11), the actuating-travel ranges overlapping at an overlap area.

14. The method of claim 13, further comprising changing lower limits (SWOL, SWUL) and upper limits (SWOU, SWUU) of the actuating-travel ranges (SWO, SWU) until the value of the signal generated by the sensor for each tooth-on-tooth position initially within the overlap area of the actuating-travel ranges (SWO, SWU) is assigned to only one of the actuating-travel ranges (SWO, SWU).

15. The method of claim 13, wherein a first actuating-travel range (SWO) of the two predefined actuating-travel ranges (SWO, SWU) represents a value range for signals generated by the sensor corresponding to tooth-on-tooth positions between the dog elements of the first group of dog elements (10A1, 11A1) of the shift-element halves (10, 11), the first actuating-travel range (SWO) having a minimum width that encompasses distances between the minimum values generated by the sensor for a tooth-on-tooth position and maximum values of the signal generated by the sensor resulting from movements of the form-locking shift element (A, F) with respect to the sensor and from a tolerance-related sensor behavior.

16. A control unit for determining an operating condition of a form-locking shift element (A, F), the form-locking shift element (A, F) comprising a first shift-element half (10) and a second shift-element half (11) which are brought into engagement with each other in a form-locking manner, wherein at least the first shift-element half (10) is displaceable between a first end position, which corresponds to a disengaged operating condition of the form-locking shift element (A, F), and a second end position, which corresponds to an engaged operating condition of the form-locking shift element (A, F), the control unit comprising:
a sensor configured to monitor a current position of the first shift-element half (10),
wherein the control unit detects an operating condition of the form-locking shift element (A, F) that is sufficiently engaged in order to transmit a torque at the form-locking shift element (A, F) when a signal generated by the sensor has a value greater than an applicable value for a defined time period and when the first shift-element half (10) is additionally actuated and displaced towards the second end position, and
wherein the applicable value corresponds to a defined overlap between the first and second shift-element halves (10, 11) which is less than an overlap between the first and second shift-element halves (10, 11) when the first shift-element half (10) is in the second end position.

17. The control unit of claim 16, wherein the control unit carries out the method of claim 1 on a control side.

18. A computer program comprising program code stored on a non-transitory computer-readable medium with software instructions to carry out the method of claim 1 when executed on a control unit.

* * * * *